US008260655B2

(12) United States Patent
Dance et al.

(10) Patent No.: US 8,260,655 B2
(45) Date of Patent: Sep. 4, 2012

(54) PRICE OPTIMIZATION WITH ROBUST LEARNING CONSTRAINT

(75) Inventors: Christopher R. Dance, Grenoble (FR); Onno Zoeter, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 127 days.

(21) Appl. No.: 12/792,124

(22) Filed: Jun. 2, 2010

(65) Prior Publication Data

US 2011/0302000 A1 Dec. 8, 2011

(51) Int. Cl.
G06Q 10/00 (2006.01)
G06Q 30/00 (2006.01)
G06F 15/18 (2006.01)

(52) U.S. Cl. ............. 705/7.29; 705/7.11; 705/7.31
(58) Field of Classification Search ............. 705/7.29
See application file for complete search history.

(56) References Cited

U.S. PATENT DOCUMENTS

| 6,012,046 | A | * | 1/2000 | Lupien et al. | 705/36 R |
| 6,151,589 | A | * | 11/2000 | Aggarwal et al. | 705/36 R |
| 7,493,280 | B2 | * | 2/2009 | Guler et al. | 705/37 |
| 7,512,558 | B1 | * | 3/2009 | Elad et al. | 705/37 |
| 2007/0112693 | A1 | * | 5/2007 | Cushing | 705/400 |
| 2007/0118463 | A1 | * | 5/2007 | Avery | 705/37 |

OTHER PUBLICATIONS

Manelli, et al. "Pricing mechanism design: Revenue maximization and the multiple-good monopoly," J. Economic Theory, 137:153-185 (2007).
Briest, et al. "Pricing Randomized Allocations," Proc. 21st Annual ACM-SIAM Symp. on Discrete Algorithms (Ed., Moses Charikar, Jan. 2010).
Aguilera, et al. "On convex functions and the finite element method," SIAM Journal on Numerical Analysis 47(4):3139-3157, (2009).
Farias, et al. "Revenue Management Beyond 'Estimate than Optimize,'" PhD. Dissertation, Stanford University (2007).
Avis, D. "IRS: A Revised Implementation of the Reverse Search Vertex Enumeration Algorithm," In: Polytopes—Combinatorics and Computation, G. Kalai & G. Ziegler eds., Birkhauser-Verlag, DMV Seminar Band 29, pp. 177-198 (2000).
Lai, et al. "Adaptive treatment allocation and the multi-armed bandit problem," The Annals of Statistics, 1987.
R. Agrawal, "Sample mean based index policies with O (log n) regret for the multi-armed bandit problem," Advances in Applied Probability, 1995.
Auer, et al. "Finite-time analysis of the multiarmed bandit problem," Machine Learning,(2002).
Chaloner, et al. "Bayesian Experimental Design: A Review," Statistical Science, (3):273-304 (1995).
Genz, et a. "Comparison of methods for the computation of multivariate-t probabilities," Journal of Computational and Graphical Statistics, 1993.

(Continued)

Primary Examiner — Jason Dunham
Assistant Examiner — Venay Puri
(74) Attorney, Agent, or Firm — Fay Sharpe LLP

(57) ABSTRACT

A valuation optimization method includes generating offeree decision information (buyer decision information, by way of illustrative example) by presenting a sequence of mechanisms to a sequence of offerees wherein the mechanisms comprise menus of transaction offers (sale offer menus, by way of illustrative example). Actual transactions (sale transactions, by way of illustrative example) are conducted responsive to acceptances of transaction offers by buyers. At a selected time in the generating, an offeree valuation distribution belief and the current mechanism are updated optimize an offeree's utility. The offeree's utility comprises an offeree's utility function constrained by a robust learning constraint computed based on a local differential of an earlier offeree's utility function with respect to the earlier offeree's valuation.

14 Claims, 8 Drawing Sheets

OTHER PUBLICATIONS

Bulla, et al. "Bayesian Nonparametric Estimation of a Bivariate Survival Function," Statistica Sinica, 17, 427-444 (2007).

Minka, T., Expectation Propagation for Approximate Bayesian Inference. *Proc. 17th Annual Conf. Uncertainty in Artificial Intelligence* (2001); and Minka, T., A family of algorithms for approximate Bayesian inference. PhD Thesis, MIT (2001).

Avis, D. "Reverse Search for Enumeration," Nov. 3, 1993.

U.S. Appl. No. 12/695,757, filed Jan. 28, 2010, Dance, et al.

U.S. Appl. No. 12/792,254, Jun. 2, 2010, Dance, et al.

U.S. Appl. No. 12/792,267, Jun. 2, 2010, Dance, et al.

U.S. Appl. No. 12/792,028, Jun. 2, 2010, Dance, et al.

Aloysius, et al. Leveraging Revealed Preference Information by Sequentially Pricing Multiple Products (2009), http://comp.uark.edu/~cdeck/Leveraging%20Revealed%20Preference%20Information%20by%20Sequentially%20Pricing%20Multiple%20Products.pdf.

Laibson, et al. "Golden eggs and hyperbolic discounting," Quarterly Journal of Economics, 112(2):443-77 (1997).

Xie, et al. "Advance Selling Theory, in Handbook of Pricing Research in Marketing," (Vithala R. Rao, Ed. (2007).

oDesk® (see www.odesk.com) accessed May 17, 2010.

Elance™ (see www.elance.com) accessed May 17, 2010.

Thanassoulis, J. "Haggling over Substitutes," Sep. 2003.

Pavan, et al. "Dynamic Design: Incentive Compatibility, Profit Maximization and Information Disclosure," May 8, 2009.

Carvalho, et al. "Dynamic Optimization and Learning: How Should a Manager Set Prices when the Demand Function is Unknown?" Sep. 2005.

Araman, et al. "Dynamic Pricing for Non-Perishable Products with Demand Learning," *DIMACS Workshop on Yield Management and Dynamic Pricing*, Aug. 2005.

Avis, et al. "A Pivoting Algorithm for Convex Hulls and Vertex Enumeration of Arrangements and Polyhedra," Nov. 1990.

Lobo, et al. "Pricing and learning with uncertain demand," Nov. 2003.

Kleinberg, et al. "The Value of Knowing a Demand Curve: Bounds on Regret for On-line Posted Price Auctions," Jul. 21, 2004.

Simon, C. "Dynamic Pricing with Demand Learning under Competition," 2004, http://mit.dspace.org/bitstream/handle/1721.1/42064/231846029.pdf?sequence=1 (Note: Reference is encrypted and cannot be printed).

Capet, et al. "A Risk Assessment System with Automatic Extraction of Event Types," *IFIP International Federation for Information Processing*, vol. 288, pp. 220-229, 2008.

"Pay-what-you-like restaurants", http://www.cnn.com/2008/TRAVEL/04/01/flex.payment/index,html (last accessed May 7, 2010).

Asmuth et al., "A Bayesian Sampling Approach to Exploration in Reinforcement Learning", 25th UAI, pp. 19-26, 2009.

K. Roberts, "The characterization of implementable choice rules", in Jean-Jacques Laffont, editor, Aggregation and Revelation of Preferences. Papers presented at the 1st European Summer Workshop of the Econometric Society, pp. 321-349. North-Holland, 1979 (Description only).

Minka, "A family of algorithms for approximate Bayesian inference", PhD Thesis, MIT (2001).

T. Heskes, and O. Zoeter, "Expectation Propagation for Approximate Inference in Dynamic Bayesian Networks", Proc. 18th Annual Conf. Uncertainty in Artificial Intelligence (2002).

Infanger, "Large-Scale Systems and Benders Decomposition", Lecture Notes, MS&E348, Stanford University (2009).

http://en.wikipedia.org/wiki/Dirichlet_distribution accessed Jun. 30, 2010.

\* cited by examiner

PRICE OPTIMIZATION WITH ROBUST LEARNING CONSTRAINT

BACKGROUND

Marketing of products entails balancing the valuations placed on items by a buyer against the prices (or, more generally, contracts) set by the seller. In general, if the buyer's valuation of an item is greater than the price of the item, then the sale is likely to occur; conversely, if the buyer's valuation is less than the price of the item then no sale is likely.

More quantitatively, a "buyer's surplus" from a purchase can be identified as the difference between the buyer's valuation of the item and the sale price. A "seller's profit" is determined by the sale price minus the cost to the seller in obtaining and marketing the item. The seller would like to sell the item at the highest price possible, since this maximizes the seller's revenue; however, if the price is set too high, and more particularly above the buyer's valuation, then no sale will occur and no revenue is obtained. Further complicating the situation is that in the case of multiple buyers, different buyers may place different values on the item, or an individual buyer may have different valuations at different times.

In existing approaches, the seller sets the price for an item based on the seller's past experience or other available information, and then adjusts the price upward or downward over time based on sales. For example, if an unexpectedly low number of sales is achieved at the initial price, the seller may lower the price in order to encourage additional sales. Conversely, if sales are brisk at the initial price then the seller may try increasing the price. If sales volume is maintained (or decreases only slightly) at the higher price, then the seller's revenue is increased. These approaches are sometimes referred to as censored price experiment (CPE) approaches. The seller estimates the distribution of buyers' valuations from censored observations (that is, observations that the valuation is greater than the price or that the valuation is less than the price; more generally a censored observation is one that is only known to come from some set).

Other approaches have been attempted for price optimization. These approaches typically are variants of the price adjustment scheme, sometimes under different nomenclature. For example, in the automotive industry it is known to offer price rebates to encourage purchases. Such rebates are simply short-term price adjustments, and can be used to learn customer valuations of the automobiles.

Other approaches attempt to rely upon self-reporting by buyers. An extreme example of this is the "pay what you like" restaurant model. In this model, the buyer actually sets the price by being allowed to pay whatever the buyer believes the restaurant meal was worth. See, e.g. "Pay-what-you-like restaurants", http://www.cnn.com/2008/TRAVEL/04/01/flex-.payment/index.html (last accessed May 7, 2010).

The various learning models are susceptible to various errors. For example, at certain times American car buyers have come to expect certain automobile manufacturers to offer frequent rebates, and delay purchase until the next rebate offer. The "pay what you like" approach is reliant upon honesty of the self-reporting, and in this regard introduces a problematic self-interest factor into the self-reporting, in that it is in the restaurant patron's self-interest to pay less than the patron actually believes the meal was worth and thereby save money.

More generally, any valuation approach that is based on collecting data from buyers (or, more generally, offerees—in procurement, for example, the offeror may be the buyer and the offeree may be the seller, that is, the potential supplier) is susceptible to error due to large deviations in valuations derived from buyer responses to an offer. Large deviations may result from intentional "lies" by buyers, or may result from inadvertent overvaluation or undervaluation. An example of the latter is an uninformed buyer who grossly overpays for an item out of ignorance.

BRIEF DESCRIPTION

In some illustrative embodiments disclosed herein as illustrative examples, a method comprises: generating buyer decision information by presenting a sequence of sale offer menus to a sequence of buyers and conducting actual sale transactions based on sale offers accepted by buyers; and at a selected time in the generating, updating a buyer valuation distribution belief and the current sale offer menu of the sequence of sale offer menus to optimize a buyer's utility comprising a buyer's utility function constrained by a robust learning constraint that is computed based on a local differential of an earlier buyer's utility function with respect to the earlier buyer's valuation.

In some illustrative embodiments disclosed herein as illustrative examples, a method comprises: generating offeree decision information by presenting a sequence of mechanisms to a sequence of offerees wherein the mechanisms comprise menus of transaction offers and conducting actual transactions responsive to acceptances of transaction offers by offerees; and at a selected time in the generating, updating an offeree valuation distribution belief and the current mechanism optimize an offeree's utility comprising an offeree's utility function constrained by a robust learning constraint computed based on a local differential of an earlier offeree's utility function with respect to the earlier offeree's valuation.

In some illustrative embodiments disclosed herein as illustrative examples, a method comprises: generating offeree decision information by presenting a sequence of mechanisms to a sequence of offerees wherein the mechanisms comprise menus of transaction offers and conducting actual transactions responsive to acceptances of transaction offers by offerees; and adjusting the sequence of mechanisms during the generating to optimize an offeree's utility respective to the generated offeree decision information wherein the offeree's utility comprises an offeree's utility function constrained by a robust learning constraint computed based on a local differential of an earlier offeree's utility function with respect to the earlier offeree's valuation In some illustrative embodiments disclosed herein as illustrative examples, a digital processor is configured to perform a method as set forth in any one of the three immediately preceding paragraphs. In some illustrative embodiments disclosed herein as illustrative examples, a storage medium stores instructions executable on a digital processor to perform a method as set forth in any one of the three immediately preceding paragraphs.

DETAILED DESCRIPTION

Figure 1:
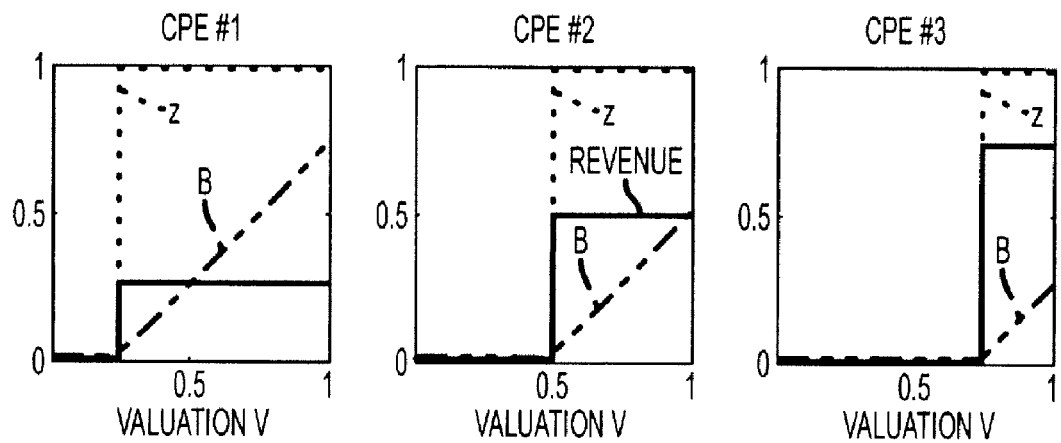
FIG. 1 diagrammatically shows three illustrative censored price experiments (CPEs) employing different price points.

Disclosed herein are approaches for finding an optimal robust learning scheme by solving a single linear program or semi-definite program (SDP). At one extreme, the method produces the hopeful mechanism (in which the offeree is assumed to be truthful), and at the other extreme it produces the stubborn mechanism. In the stubborn mechanism, the offeror acts according to their initial belief, without learning or at least attempting to adapt on the basis of new observations about the distribution of offeree valuations. While the stubborn mechanism does not learn, it is not necessarily the case that the menus of lotteries offered to a sequence of offerees are all the same, since the offeror may confront different selling costs at different times. In these approaches, the seller solves a multidimensional mechanism design problem in which: (i) there is a sequence of mechanism functions (e.g. one for each buyer) rather than a single such function; and (ii) there is an additional constraint that couples mechanisms across time to achieve robust learning.

The additional constraint (ii) is referred to herein as the robust-learning constraint, and is intended to enforce the condition that "Past players' lies affect the past players more than they affect future players," or more succinctly, "Lies hurt liars more than they hurt others," or more precisely, "When past players make large deviations, the deviations hurt those past players more than they affect future players or than they affect the seller." (The term "player" is used herein to encompass a buyer in the case of a seller optimizing a sale price, or to encompass a seller or supplier in the case of a buyer optimizing a procurement contract price, or so forth).

Some illustrative examples are set forth. One illustrative example is based on a lottery optimization approach which is described herein. This lottery approach considers the state space to be a space of functions, known as beliefs. The lottery-based pricing approaches disclosed herein consider the control space to be a space of functions, known as mechanisms or designs. Mechanisms correspond to menus of lotteries and variable lotteries. The term "lottery" as used herein refers to a sale offer having a sale price and non-deterministic consideration or allocation for the sale price. The consideration (or allocation) is broadly defined herein as "what is received in return for the sale price". In a conventional purchase, the consideration is the item that is purchased. This is a deterministic consideration. In the case of a lottery, the consideration is non-deterministic in that what the buyer receives in return for the sale price is not fixed. For example, in an illustrative lottery the consideration comprises a chance (e.g., 60% chance) of receiving the item. In another illustrative lottery the consideration comprises receiving either item "A" or item "B" (e.g. a 60% chance of receiving item "A" and a 40% chance of receiving item "B"). Herein, however, the term "lottery" is broadly construed as encompassing deterministic offers. Said another way, a "lottery probability" as used herein includes the range [0,1] inclusive, and probability=1 or probability=0 is a possible lottery probability.

The lottery approach can be understood in terms of what is referred to herein as a "Schrödinger's Price Experiment" (SPE). A conventional censored price experiment (CPE) uses a sequence of prices. The SPE combines all these prices as a "superposition" to enable experimenting on the sequence of prices simultaneously or concurrently. The label "Schrödinger" analogizes to similar superposition experiments in quantum physics which also have non-deterministic outcomes. As already noted, however, such a superposition cannot be constructed simply by offering the buyer a set of different prices at each round, because many (possibly most) buyers would select the lowest price since that selection is in the buyer's self-interest.

However, if the lowest price only gave the item with some probability or in some other non-deterministic fashion, then the buyer would select between different sale offers (that is, between different lotteries with different lottery probabilities in the range [0,1] inclusive) without necessarily being biased by self interest toward choosing the lowest sale price. Indeed, as disclosed herein the sale prices and probabilities for the lotteries can be selected in such a way that only buyers with specific valuations will rationally prefer a given lottery. As a consequence, the SPE learns faster than a CPE because it collects data for different price points simultaneously, yet it is otherwise equivalent.

Figure 2:
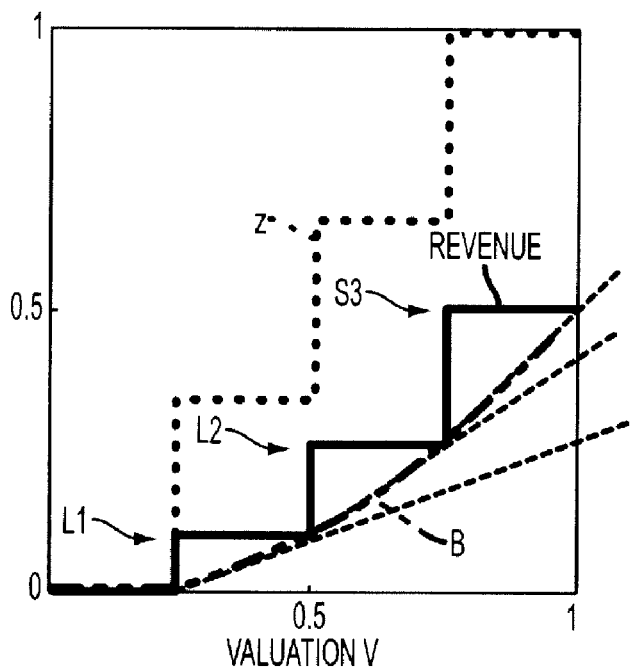
FIG. 2 diagrammatically shows a single "Schrödinger's Price Experiment" (SPE) that is equivalent in expected seller revenue and buyer surplus to the three CPEs of FIG. 1.

With reference to FIGS. 1 and 2, a comparison of CPE and SPE is shown. In each plot of FIG. 1, the abscissa is the buyer's valuation v, a dotted line indicates the preferred outcome probability for a buyer with this valuation (for the CPE this is always zero or one), a solid line denotes the price p that a buyer with the given valuation pays when they act in accordance with their preferences (thereby maximizing their surplus), and the dot-dashed line shows the buyer's surplus. FIG. 1 shows three illustrative CPEs. In "CPE #1", the price is set at $0.25; in "CPE #2", the price is set at $0.50; in "CPE #3", the price is set at $0.75. In each case, a given sale or no-sale provides a single data range for learning, namely $v \geq p$ in the case of a buyer, or $v < p$ in the case of a non-buyer.

FIG. 2 shows a single SPE that is equivalent in expected buyer surplus and seller revenue to the three CPEs of FIG. 1. FIG. 2 uses the same symbolism as FIG. 1, except that three prices that are denoted in FIG. 2 correspond to two lotteries L1, L2 and a deterministic sale S3 (or, equivalently, a lottery having lottery probability=1), respectively. Each sale offer (that is, each lottery L1, L2 or deterministic sale S3) is denoted by labeling the sale price p, which is the revenue generated by a sale. In the first lottery L1 the sale price p=$1/12, but the non-deterministic consideration has an associated probability z=1/3, so that the "effective" price is p/z=$0.25. The second lottery L2 and the deterministic sale S3 have increasingly higher sale prices and increasingly higher associated probabilities (p=1 in the case of the deterministic sale S3), and hence increasingly higher "effective" prices p/z. The buyer's surplus in these cases is also modified by the probability z so that the buyer's surplus is given by vz−p, reflecting the (probabilistic or statistical) valuation of the non-deterministic consideration received in compensation for paying the sale price. (Note that in the case of a deterministic sale the lottery probability z=1 and the buyer's surplus reduces to the conventional v−p.) By suitable selection of the sale price and probability for each lottery, the valuation vz−p can be made to be continuous and piecewise linear with the linear segments of increasingly larger slope for higher (effective) price.

As a result, a rational buyer will find that one of the three sale offers L1, L2, S3 provides an optimal buyer's surplus as compared with the other sale offers. This is emphasized in FIG. 2 by showing the three (non-zero) buyer's surplus lines for the three lotteries each extended by a dotted line to greater than v=1. For buyers with any valuation excepting v=$0.25, $0.5 or $0.75 precisely, the only rational selections are as follows: for v<$0.25, the buyer makes no purchase because none of the sale offers L1, L2, S3 provide a positive buyer's surplus; for $0.25≦v<$0.50 the first lottery L1 is selected because only the first lottery provides the buyer with a positive buyer's surplus; for $0.50<v<$0.75 the second lottery L2 is selected because although both the first and second lotteries L1, L2 provide a positive buyer's surplus the second lottery L2 provides a larger buyer's surplus; and finally for v≧$0.75 the deterministic sale S3 is selected because it provides the largest buyer's surplus (although for this valuation range all three sale offers L1, L2, S3 provide a positive buyer's surplus).

An illustrative example is given next for computing the sale price p and probability z for a case involving two lotteries, which is equivalent to two CPE, namely a first CPE that sets a sale price $v_1$ on $n_1$ days, and a second CPE that sets a sale price $v_2$ on $n_2$ days. A corresponding SPE would include a first lottery having a sale price $$\frac{n_1}{n} v_1$$

for probability $$\frac{n_1}{n}$$

receiving the item, and a second lottery having a sale price $$\frac{n_1}{n} v_1 + \frac{n_2}{n} v_2$$

for probability 1 of receiving the item. In these expressions n:=$n_1+n_2$. Imagine that buyers have valuation lower than $v_1$ with probability $1-q_1-q_2$, valuations in $[v_1, v_2)$ with probability $q_1$ and valuations in $[v_2,\infty)$ with probability $q_2$. These probabilities are unknown to the seller. The expected profit (assuming zero seller cost, although a non-zero seller cost is readily accommodated by a shift in valuations) is $(q_1+q_2) v_1 n_1 + q_2 v_2 n_2$ for the CPE, and is $$n\left(q_1 \frac{n_1}{n} v_1 + q_2\left(\frac{n_1}{n} v_1 + \frac{n_2}{n} v_2\right)\right)$$

for the SPE. It is readily verified that these are equivalent. However, in the case of the CPE, when the sale price $v_2$ is rejected by a buyer, the CPE does not know if this was due to the buyer having a valuation that is lower than $v_1$, or is due to the buyer having a valuation in the range $[v_1, v_2)$. In contrast, the SPE distinguishes these cases. While the foregoing lottery example tests two valuations $v_1$ and $v_2$, extension to three, four, or more valuations is straightforward through the use of additional lotteries. In general, a lottery for a single-item problem includes a non-deterministic sale offer in which the non-deterministic consideration is a probabilistic consideration having a probability P of receiving the item and a probability (1−P) of not receiving the item. In the limiting case of a deterministic sale offer, the lottery probability equals unity and the buyer is guaranteed to receive the item in return for tendering the sale price.

The lottery approach can also address two, three, four, or more (in general, N) items for sale. Some of the N items may be mutually exclusive such that purchase of one item precludes purchase of another item. For example, if the items for sale are different brands of toothpaste, then (at least in many cases) the purchase of one brand of toothpaste will preclude the buyer from purchasing another brand of toothpaste at the same time. In the case of N such "mutually exclusive" items (where N is at least two), the non-deterministic consideration of the non-deterministic sale offer defining the lottery is suitably constructed as receipt of one of the N items, with the item received determined probabilistically. One or more such lotteries can be used to determine (in this example) the optimal sale price for each different brand of toothpaste. (Again, in the limiting "endpoint" cases the probability of receiving one item is unity and the probability of receiving the other item is zero, thus reducing to a deterministic sale).

More generally, in the case of a multi-item problem the lotteries can be optimized to identify an optimal sale offer which may, in general, itself be a lottery. By way of illustrative example, in the marketing of two brands A and B of toothpaste, if the (average) buyer does not particularly prefer either brand A or brand B, then the optimal sale offer may be a lottery having a discounted sale price (as compared with a deterministic sale of brand A or a deterministic sale of brand B) for which the consideration is a 50% likelihood of receiving brand A and a 50% likelihood of receiving brand B.

Figure 3:
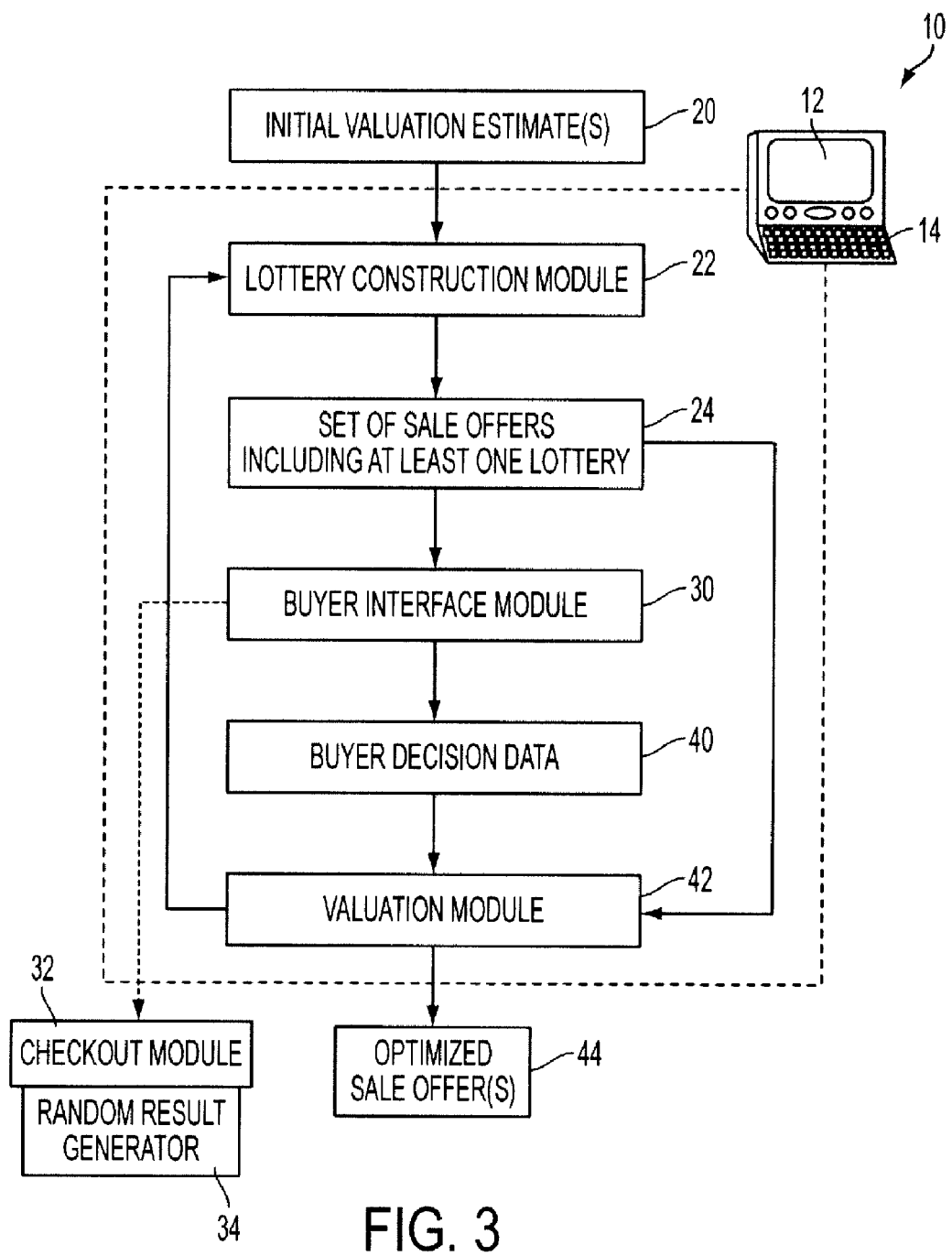
FIG. 3 diagrammatically shows a pricing system employing lotteries.

With reference to FIG. 3, an illustrative pricing system employing pricing optimization via lotteries is described. Because the construction of lotteries and the determination of estimates of the distribution of valuations based on lottery results is computationally intensive, the disclosed pricing system is computer-based, in the illustrative example being implemented using an illustrative computer 10 having user interfacing devices such as an illustrative display 12 and an illustrative keyboard 14. The illustrative computer 10 is a personal computer, such as a desktop computer or a laptop computer. However, in other embodiments the computer and associated components may be otherwise configured. For example, in the case of Internet-based marketing, the computational components of the pricing system may reside on a suitable server computer that is in wired or wireless connection with the Internet, and a buyer may interact with the server computer via any Internet-capable device such as a computer, cellular telephone, personal data assistant (PDA), tablet (e.g., an iPad™ available from Apple Corporation, Cupertino, Calif., USA), or so forth.

With continuing reference to FIG. 3, to initiate the lottery-based pricing process, the seller provides an initial belief over possible valuation distributions 20. This belief over valuation distributions is suitably the same as might be chosen for a set of CPE experiments. More generally, the belief over valuation distributions may be chosen on the basis of diverse factors. For example, because the pricing process is performed concurrently with actual selling of the products, the initial valuation estimates 20 should be high enough that the seller has some sales revenue (that is, not selling at a loss), but should not be so high that the price results in few or no sales. In general, the valuation distribution alone does not determine the price. The seller cost also determines the mechanism offered (e.g. prices)—if the objective is profit for the seller then no reasonable mechanism design would offer below-cost consideration or allocations, since then the seller would lose money. Moreover, the approaches disclosed herein are not limited to the application of seller profit maximization, but rather can also be applied for optimizing respective to other goals, such as maximizing buyer welfare (e.g. the sum of buyers' valuations) or optimizing loading on product suppliers or internal supply lines. The optimization can be respective to a combination of objectives: by way of illustrative example, an optimization that maximizes a sum (or other balancing) of buyer welfare (i.e., surplus) and seller profit. Such an optimization balancing seller profit and buyer welfare is suitable, for example, in the case of healthcare products. Given that human valuation distributions may be complex, due to the range of outside options, budget constraints and a heterogeneous population of buyers, it is advantageous for the belief over the valuation distribution to be flexible in terms of what valuation distributions it can represent. In some embodiments, the initial belief may be chosen by a programmer and a cooperating salesperson without mutual knowledge and understanding of each other: for instance, the programmer might not understand the salesperson's appreciation of a product, while the salesperson might not understand computations with probability density functions.

A lottery construction module 22 generates a plurality of sale offers for the one or more items for sale. At least one of the sale offers should be a non-deterministic sale offer having a sale price and non-deterministic consideration for the sale price. As already described, for example with reference to FIG. 2, the sale offers should also be selected such that only buyers with specific valuations will rationally prefer a given lottery. Said another way, for a given valuation there should be one sale offer (or, at most a definable sub-set of the total plurality of sale offers that does not greatly intersect with other available sub-sets) that provides the highest buyer's surplus (in the stochastic sense of expectation over future outcomes). The output of the lottery construction module 22 is a set of sale offers 24 including at least one lottery having a non-deterministic consideration.

Once the set of sale offers 24 is established, the "Schrödinger's Price Experiment" (SPE) is carried out by a buyer interface module 30, which presents a buyer with the set of sale offers 24 including at least one lottery that is offered at least at one time instant. It is to be understood that the buyer interface module 30 engages in actual selling using the set of sale offers 24 as genuine offers for sale. The illustrative example of FIG. 3 is an Internet-based selling, for which the buyer interface module 30 is suitably a retailer (or, more generally, seller's) website that presents the set of sale offers 24 to a customer. If the buyer accepts a sale offer, then this is an actual sale which is implemented by a checkout module 32 which carries out the transaction. Again, for the illustrative Internet-based marketing system of FIG. 3, the checkout module 32 is computer-implemented and employs a suitable Internet-based approach for collecting the sale price and conveying the purchased item to the purchaser. For example, the sale price may be collected using a credit card number, a Paypal™ account (available at https://www.paypal.com/, last accessed May 10, 2010), or so forth, and the item delivery is suitably implemented by electronic contracting with a commercial shipping company.

In the case of a transaction in which the accepted sale offer is a non-deterministic sale offer in which the return for the sale price is non-deterministic consideration, the checkout module 32 suitably includes or has access to a random result generator 34. (As is conventional in the art, the term "random result generator" as used herein includes both true random number generators and "pseudorandom number generators", for example a processor implementing a pseudorandom number generation algorithm in which the output is actually deterministic but has sufficient complexity, and a distribution approximating a random number distribution, so as to appear to be random and to well approximate a given distribution of random numbers). For example, if the accepted sale offer is a single-item lottery in which the consideration is a 30% chance of receiving the item, then the checkout module 32 suitably evaluates result=0.3*R where R is a random (encompassing pseudorandom) number generated by a random (encompassing pseudorandom) result generator implementing a uniform or constant probability density function over the range [0,1). If result is less than or equal to 0.3 then the buyer "wins the lottery", and the item is shipped to the buyer. On the other hand, if result is greater than 0.3 then the buyer "loses the lottery" and the item is not shipped to the buyer. In either case, the checkout module 32 suitably informs the buyer whether or not the buyer "won the lottery", that is, whether or not the buyer will be receiving the item. Preferably, this information is provided to the buyer as a purchase receipt, and is preferably also stored in a persistent repository (not shown) owned by the seller. The persistent repository provides data for tax purposes, and for tracking performance of the checkout module 32 to ensure and verify that the checkout module 32 is providing "fair" lottery results in a statistical sense.

Operation of the checkout module 32 ensures that buyer decisions are "real" decisions that have real-world consequences for the buyer. This, in turn, ensures that the buyer acceptance/rejection data 40 collected by the buyer interface module 30 accurately reflects real-world buyer decisions that inform about buyer valuation. As already noted, the checkout module 32 also engages in actual selling of items, and so generates a continuing revenue stream for the seller during the pricing optimization process. A valuation module 40 processes the buyer acceptance/rejection data 42 to determine a distribution of buyer valuations indicated by actual purchases. (More generally, given covariates on buyer valuations, the valuation module 40 may in some embodiments process the buyer acceptance/rejection data 42 to determine a family of distributions over buyer valuations, which itself may vary with time.)

With continuing reference to FIG. 3 and with brief returning reference to FIG. 2, by way of example a sale of lottery L2 indicates that the buyer valuated the product in the range $0.5 \leq v < 0.75$. On the other hand, a sale of lottery L1 indicates that the buyer valuated the product in the range $0.25 \leq v < 0.50$. A "no sale" indicates the buyer valuated the product at $v < 0.25$. A sale of lottery L3 indicates that the buyer valuated the product at v>0.75. (The foregoing assumes that the buyer was not deviating from their true selfish interest.)

The valuation distribution information output by the valuation module 42 can be used in various ways. One approach is to use this valuation distribution information as feedback supplied to the lottery construction module 22, which can then construct refine the set of sale offers 24 and repeat the process to further refine the estimated valuation distribution. This can be repeated cyclically to refine the estimated valuation distribution. The cycle can be repeated after each buyer makes a decision, or after a selected number of buyers make decisions. The final result (either with or without iteration) is a set of one or more optimized sale offer(s) 44 for the product. If iteration is employed, it is expected that the iterations for a single-item problem will ultimately converge to a final discrete sale price for the item. In the case of a multiple-item problem the convergence may be to final discrete sale prices for the respective (multiple) items, or the convergence may be to an optimized menu of lotteries.

In FIG. 3 which illustrates an Internet-based price-optimization system, the system is substantially completely automated. In other applications, certain operations may be manual, that is, performed by a human seller. For example, the buyer interface module 30 may in some embodiments be replaced by a human seller who presents the set of sale offers 24 to the buyer, for example in the context of a product showroom, or in an on-site sales visit, or in responses to a request for proposals or so forth. In such embodiments, the checkout module 32 may optionally also be replaced by human action, for example by a human salesperson or team of salespeople closing the sale. In such embodiments, the random result generator 34 may continue to be a computer-based random result generator, or may use a suitable mechanical random result generator such as one or more dice.

Figure 4:
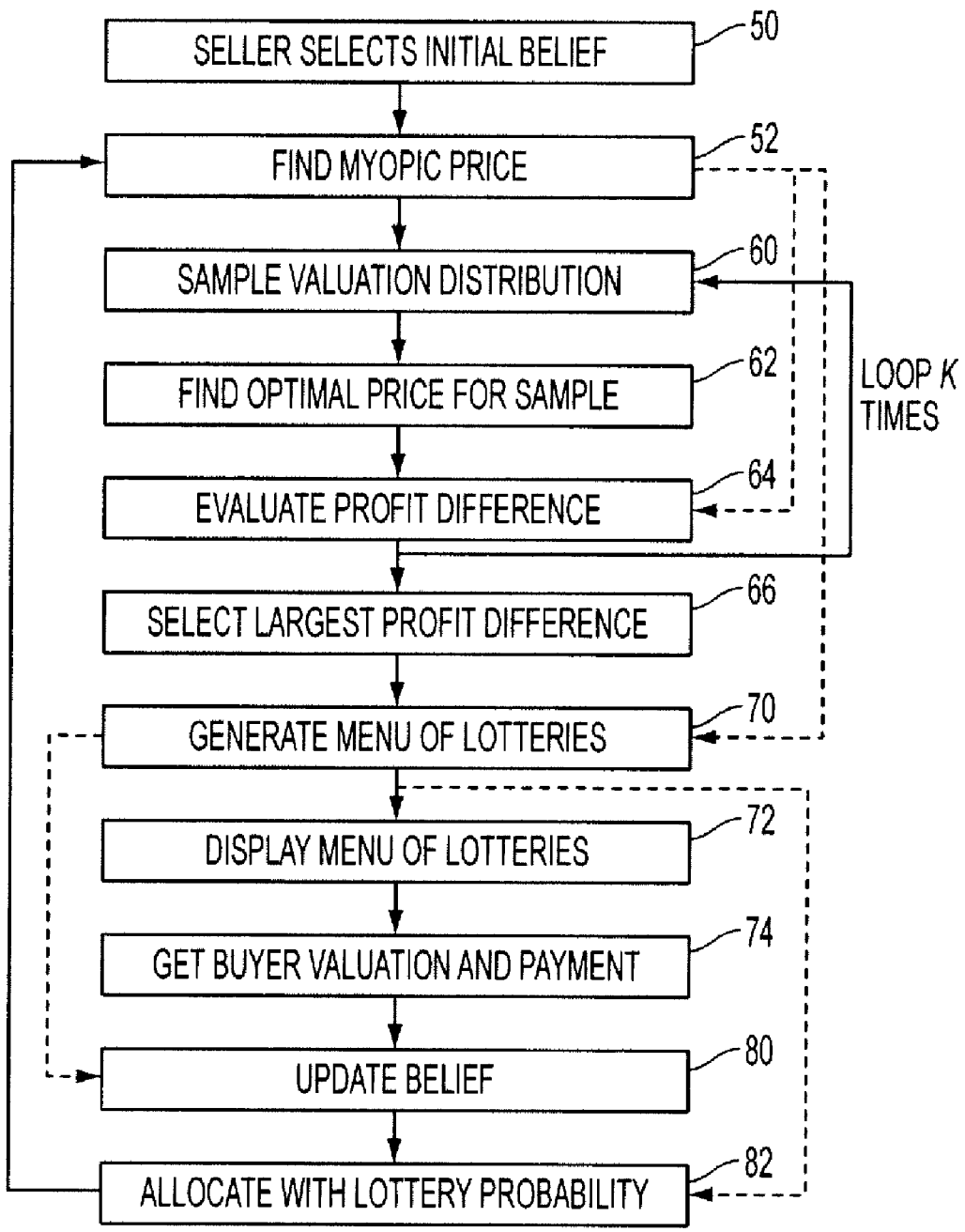
FIG. 4 diagrammatically shows a pricing optimization suitably performed by the pricing system of FIG. 3.

With reference to FIG. 4, operation of the lottery-based price optimization is further described. Initially, the seller has a belief over buyers' valuation distributions. This is represented in FIG. 4 by an operation 50 in which the seller selects the initial belief, and an operation 52 in which this belief is used to set an initial price. In FIG. 4, the selected price is a "myopic" price, that is, a price selected for immediate value and therefore non-strategic and non-learning). The operations 50, 52 of FIG. 4 correspond with the initial valuation estimate(s) 20 of FIG. 3. The following process then repeats: (1) Experimental Design (FIG. 4 operations 60, 62, 64, 66, 70, 72): The seller proposes some lotteries for some items, where some of the non-deterministic lotteries are chosen in order to learn about buyer values; (2) Observation (FIG. 4 operation 74): A current buyer selects from those lotteries on the basis of their private values for the items; and (3) Belief Update (FIG. 4 operation 80): The seller updates the lotteries offered to another buyer on the basis of the current buyer's selection between lotteries. FIG. 4 operations 60, 62, 64, 66 are suitably performed by the lottery construction module 22 of the system of FIG. 3. FIG. 4 operations 70, 72, 74 are suitably performed by the buyer interface module 30 of the system of FIG. 3. FIG. 4 operation 80 is suitably performed by the valuation module 42 of the system of FIG. 3. Additionally, FIG. 4 diagrammatically indicates an "allocation with lottery probability" operation 82 which suitably corresponds to the checkout process performed by the checkout module 32 of FIG. 3.

With continuing reference to FIG. 4, some illustrative examples of the process are set forth. The operations 50, 52 of FIG. 4 relating to the valuation and belief model are first addressed. In the illustrative examples, the buyers' valuations are assumed to be multinomial—thus any discrete distribution can be modeled. Without loss of generality, the buyer's valuations are assumed to be one-dimensional on a uniformly spaced grid, and the seller is assumed to have a Dirichlet belief over the parameters of the multinomial.

To quantify the illustrative example, the valuations are drawn from a multinomial distribution over a set $V := \{v_1, v_2, \ldots, v_N\}$. The assumption of a known finite set of valuations can in some cases be motivated by a discretization of the space of monetary units. The multinomial has parameter vector $\theta = \{\theta_1, \ldots, \theta_N\}$ with $\Sigma_{i=1}^N \theta_i = 1$. A buyer is understood to have valuation $v_k$ with probability $\theta_k$.

While the set of possible valuations V is known, the probabilities $\theta$ of observing particular values is not known perfectly to the seller. A Dirichlet distribution is taken as the assumed density (i.e. representation of the seller's belief about the parameters of the multinomial) in the illustrative examples. The Dirichlet distribution is sufficiently general to allow any specific valuation probabilities $\theta$ and is thus known as a non-parametric prior. Choosing such a distribution makes much sense as real-world valuation distributions are known to be rather complex, involving sharp transitions from budget constraints and competing outside options.

At time step t=0 the seller's Dirichlet belief is given by parameters $\alpha = \{\alpha_1, \ldots, \alpha_N\}$ with $\alpha_i > 0$. The corresponding probability density function over possible valuation distributions is:

$$\mathbb{P}(\theta) := Dir(\theta; \alpha) = \frac{\Gamma(\alpha_1 + \ldots + \alpha_N)}{\Gamma(\alpha_1) \ldots \Gamma(\alpha_N)} \theta_1^{\alpha_1 - 1} \ldots \theta_N^{\alpha_N - 1}.$$

The Dirichlet distribution is conjugate to the multinomial. Therefore computing posteriors $\mathbb{P}(\theta|v_i)$ after fully-observing a buyer's value $v_i$ is easy. The result is another Dirichlet with parameters $\alpha' := \alpha + e_i$ where $e_i$ is a shorthand for a vector of length N with a 1 at position i and zeros everywhere else. That is:

$$\mathbb{P}(\theta|v_i) = \frac{\Gamma(\alpha_1 + \ldots + \alpha_N + 1)}{\Gamma(\alpha_1) \ldots \Gamma(\alpha_i + 1) \ldots \Gamma(\alpha_N)} \theta_1^{\alpha_1 - 1} \ldots \theta_i^{\alpha_i} \ldots \theta_N^{\alpha_N - 1}.$$

The experimental design is next addressed by way of illustrative example. This corresponds to FIG. 4 operations 60, 62, 64, 66, 70, 72, in which the seller proposes some lotteries for some items, where some of the non-deterministic lotteries are chosen in order to learn about buyer values. These operations create a menu of lotteries that: (i) is as myopic as possible, as this maximizes profit; (ii) simultaneously explores alternative prices that might result in more profit than the myopic optimum; and (iii) ensures that observations can be believed given that a buyer may be a liar.

To trade-off exploration and exploitation, in the illustrative examples an approach is adopted that is similar to the best of sampled sets (BOSS) method of Asmuth et al (2009). J. Asmuth et al., "A Bayesian Sampling Approach to Exploration in Reinforcement Learning", 25th UAI, pp. 19-26, 2009. BOSS drives exploration by sampling multiple models from the posterior belief and selecting actions optimistically.

Multiple multinomial models of buyer valuations are sampled from the Dirichlet posterior belief, as per operation 60. For each sample, the profit-maximizing price and the corresponding expected profit on the sampled valuation distribution are identified, as per operations 62, 64. Some samples have a high expected profit on their valuation distribution relative to the expected profit of the myopic-optimal price on the current posterior. This could happen in two ways. Firstly, because the sampled valuation distribution has more buyers just above the myopic-optimal price. In this case, the myopic price would also perform well. Secondly, because the price is substantially different from the myopic-optimal. In this case, the myopic price is rather risky and it is imperative to explore the alternative price. Accordingly, in the illustrative examples a sample is considered to be "optimistic" if the expectation on the sample's valuation distribution of the difference between the profit for the sample's optimal price and the profit for the myopic-optimal price is large. Note that an optimistic sample could correspond to a price that is higher, lower or equivalent to the myopic-optimal price.

For simplicity, the illustrative examples mix just one optimistic price with the myopic-optimal price. The resulting menu of lotteries will then have two or three market segments, that is, sets of valuations, where all buyers in each segment will receive the same lottery probability and price. The highest value segment will receive the item with probability one and the lowest segment will receive the item with probability zero. The intermediate segment, when there is one, will receive the item non-deterministically. To ensure that observations are robust to liars, it is ensured that any buyer wishing to select a lottery other than that which maximizes their surplus will lose at least E of that surplus. This is referred to as $\epsilon$-incentive compatibility. For the assumptions above, this means that the buyer will decide not to lie.

Given the myopic-optimum price $v_m$, and the optimistic price $v_u$, in the operation 66 the problem is to find profit-maximizing lotteries such that we can distinguish between values in the segments $[0, v_m), [v_m, v_u), [v_u, \infty)$ or in the segments $[0, v_u), [v_u, v_m), [v_m, \infty)$ with $\epsilon$-incentive compatibility. For the sake of obtaining simple formulae, in the illustrative examples it is assumed that $$\epsilon = \frac{\Delta v}{12}$$

where $\Delta v$ is the spacing between successive valuations in the Dirichlet model. This problem turns out to be a linear program (LP). By observing which constraints should be active, it is straightforward to find a closed-form solution to this LP. In the upper segment the lottery has probability 1. The rest of the solution is parameterized as follows: in the middle segment the lottery probability is z; in the interval with lowest valuation $v_u$, the price is $p_u$; and in the interval with lowest valuation $v_m$, the price is $p_m$. The solution is then:

$$v_m < v_u \Rightarrow z = \frac{5}{6}, p_m = \frac{10v_m - \Delta v}{12}, p_u = \frac{v_u + 5v_m - \Delta v}{6}$$

$$v_u < v_m \Rightarrow z = \frac{1}{6}, p_m = \frac{v_u + 5v_m - \Delta v}{6}, p_u = \frac{2v_u - \Delta v}{12}$$

$$v_u = v_m \Rightarrow p_u = p_m = v_u - \frac{\Delta v}{12}.$$

In summary the steps of the experimental design are: (i) Given belief hyperparameters $\alpha$ over the parameters $\theta$ of the valuation distribution, (ii) Find the myopic-optimal price p* for the current belief, (iii) Sample K parameter vectors $\theta_1, \ldots, \theta_K$ from the current belief (K=5 is used in some illustrative examples herein), (iv) For each sample $\theta_k$ solve for the optimal price $p_k$, (v) Evaluate the profits $\pi_k$ and $\pi^*_k$ for this optimal price and for the myopic-optimal price on this sample, (vi) Select an optimistic price with index k satisfying $\pi_k - \pi^*_k \geq \pi_j - \pi^*_j$ for all $j \neq k$, and (vii) Obtain the menu of lotteries for valuations $v_u = p_k, v_m = p^*$ using the formulae given immediately above.

It is noted that the foregoing differs substantially from conventional BOSS. For example, BOSS attempts to solve general Markov Decision Problems (MDPs), and accordingly BOSS selects actions from different models in different observable states. That step is not employed herein, as the system is assumed herein to be always essentially in just one "observable state" corresponding to the multinomial distribution being fixed rather than time-varying. Another difference is that BOSS selects a single action at each state, whereas in the illustrative approaches disclosed herein several are selected to be explored in parallel. In some illustrative examples, two actions are selected: the myopic action and the optimistic action. Yet another difference is that BOSS defines an "optimistic" action as one that maximizes expected discounted reward when all possible sampled models of the world can be chosen from, whereas the illustrative examples herein define an optimistic action as one that maximizes expected welfare or profit on a sample relative to the welfare or profit that the myopic action would attain on that sample.

While the above description of the selection of the myopic and optimistic prices used the words "profit" or "welfare", these terms were for simplicity of exposition. It is also contemplated for the buyer's objective in selecting the myopic and optimistic prices to reflect some weighted linear combination of seller profit and buyer surplus, where the weight for either part of the combination is significantly non-zero. On the one hand, the seller would be "squeezing" their buyers; on the other hand, the seller would have to "squeeze" their suppliers. Both extremes may be undesirable in various applications. In some complex real-world settings, a weighted linear combination of profit and welfare may be achievable. See, e.g. K. Roberts, "The characterization of implementable choice rules", in Jean-Jacques Laffont, editor, Aggregation and Revelation of Preferences. Papers presented at the 1st European Summer Workshop of the Econometric Society, pages 321-349. North-Holland, 1979.

The belief update is next addressed by way of illustrative example. This corresponds to FIG. 4 operation 80, in which the seller updates the lotteries offered to another buyer on the basis of the current buyer's selection between lotteries. Any observed valuation $v_o$ is considered as a censored observation of the region of valuations:

$$R(v_o, \epsilon) := \{v : w(v, v_o) \geq w(v, v) - \epsilon\},$$

where w(a,b) is the surplus of a buyer who has valuation a but lies that their valuation is b. For any observation, this corresponds to one of the two or three segments generated in the experimental design.

We lose conjugacy to the Dirichlet density in the case that $v_i$ is not directly observed but instead is known to come from set $S \subset V$. In this case, the exact posterior is a mixture of Dirichlet's (MoD). To see this, consider that Bayes's rule gives:

$$\mathbb{P}(\theta | v \in S) = \frac{\mathbb{P}(\theta, v \in S)}{\mathbb{P}(v \in S)} = \sum_{i \in S} \mathbb{P}(\theta | v_i) \frac{\mathbb{P}(v_i)}{\sum_{j \in S} \mathbb{P}(v_j)}.$$

After T censored observations with censoring set $S_t$ at time t there may be many components to this mixture. This not computationally tractable.

If it is desired for the belief to remain in some simple family, one could apply assumed density filtering (ADF) or expectation propagation (EP), as described, for example, in: Minka, "Expectation Propagation for Approximate Bayesian Inference", Proc. 17$^{th}$ Annual Conf. Uncertainty in Artificial Intelligence (2001); Minka, "A family of algorithms for approximate Bayesian inference", PhD Thesis, MIT (2001); and T. Heskes, and O. Zoeter, "Expectation Propagation for Approximate Inference in Dynamic Bayesian Networks", Proc. 18$^{th}$ Annual Conf. Uncertainty in Artificial Intelligence (2002). ADF computes the posterior after each observation and then updates the posterior by projecting it in the sense of minimum Kullback-Leibler divergence, into the simple family of beliefs.

If the different mixture components are close to each other, the mixture of Dirichlet's (MoD) posterior may be well-approximated by a single Dirichlet distribution. For instance, the MoD posterior is suitably projected onto a single Dirichlet by the standard Kullback-Leibler (KL) projection. For probability densities from exponential families, the best matching approximation in the KL sense is one that matches so-called natural moments. The natural moments for the Dirichlet are $\mathbb{E}\log\theta_i$.

To construct such approximations, a link function is suitably used. A link function informs as to the expected natural moments for a given set of parameters. It is thus generally a mapping from a parameter vector to a moment vector. The inverse of the link function informs as to what the parameter values should be if the natural moments are to have some specific values. The link function for the Dirichlet is:

$$[g_i(\alpha)] := \left[\mathbb{E}_{\mathbb{P}_{(\theta|\alpha)}}\log\theta_i\right] = \begin{bmatrix} \psi(\alpha_1) - \psi(\alpha_0) \\ \vdots \\ \psi(\alpha_N) - \psi(\alpha_0) \end{bmatrix}, \alpha_0 := \sum_{i=1}^{N}\alpha_i,$$

where $\psi$ is the digamma function, $$\psi(z) := \frac{d\log\Gamma(z)}{dz}.$$

Thus, to find a best-approximating set of Dirichlet parameters $\alpha'$ to a MoD with probability density function $M(\theta)$ it is sufficient to compute $$\alpha' = g^{-1}(\mathbb{E}_{\theta \sim M}\log\theta)$$

where $\log\theta$ is an abbreviation for the vector with components $\log\theta_1, \ldots, \log\theta_N$. Often there is no closed form for the inverse link function or for the expected natural moments. Fortunately, for a MoD, the expected natural moments are simply the weighted combination of the natural moments of the individual Dirichlets making up the mixture.

Determination of the inverse link function is next addressed. For the Dirichlet updates, the expression to be solved is:

$$\mathbb{E}_{\theta \sim M}\log\theta_i =: M_i = \psi(\alpha_i) - \psi(\alpha_0), \alpha_0 := \sum_{i=1}^{N}\alpha_i.$$

Putting $x := \psi(\alpha_0)$ shows that the only nontrivial part of this problem is the root-finding problem:

$$f(x) := \psi\left(\sum_{i=1}^{N}\psi^{-1}(M_i + x)\right) - x = 0.$$

While this is a single non-linear equation, it involves inverse digamma functions, for which rational or spline approximants can be approximated. As an alternative solution, a direct application of Newton's method to the full set of equations using sparse matrix operations is highly efficient.

The foregoing assumes that buyers operate in their self-interest, and (since they are engaged in actual purchases) do not "lie" in their valuations. However, the analysis can also be adapted to allow for buyers to "lie", that is, to set forth valuations that are not in accord with the buyer's internal belief. This is quantified as follows: each buyer may be a liar who is willing to lose an amount of their surplus in order to fool a mechanism.

The foregoing description relates to embodiments relating to selling, with optimization of buyers' welfare, seller's profit, or a linear weighted mixture of these objectives, or so forth. More generally, the disclosed approaches involving superpositions can also be readily applied to procurement, to repeated auctions with a reserve price which might be varied, to a variety of repeated exchange scenarios such as double auctions (markets), to purchases immediately involving multiple parties and to "multi-sided markets" (also known as "platforms" where the seller sets a price to multiple parties, as when a credit card firm makes charges to both card owners and shops that accept the credit card). In the case of repeated procurement, a buyer may wish to purchase an item at a sequence of times for a reasonably low price. The buyer may not be in a suitable situation to identify precisely what a reasonably low price is for certain kinds of items. Rather than posting a guess for the highest price that the buyer is willing to pay, the buyer may attempt to learn about the distribution of sellers' costs or of sellers' outside options. In this case, a cost may be considered as a negative valuation and the arguments disclosed above apply. For instance, in the analogue of a CPE, the buyer may post a purchase price of $1 for one week and a purchase price of $2 for a second week. Using the analogous SPE the buyer would post a purchase price of $3/2 for a purchase of the item with probability 1 and a price of $1 for a purchase with probability ½. The non-deterministic situation might be implemented as the buyer paying $1 and subsequently, on sharing a random variable distributed as a Bernoulli variable with probability ½, deciding to receive the purchase or to not receive the purchase. Analogously to the use of the SPE for selling, the SPE for purchasing preserves the buyer's surplus and the seller's profit that would be achieved via a CPE, but it is, advantageously, possible to learn faster with an SPE than with a CPE.

To generalize, in the disclosed approaches an offeror presents a plurality of offers to one or more offerees, the offers including at least one non-deterministic offer having non-deterministic consideration for the offeree. The offeror receives decision data responsive to the presenting, and generates offeree valuation information based on the decision data. The offeror may then present a new offer based on the generated offeree valuation information. In the illustrative case, the offeror is the seller and the offeree is the buyer; however, in a procurement application the offeror may be the buyer who makes various offers to purchase a product at various purchase prices, at least one of which is a lottery in which the price paid is non-deterministic, and the offeree may be a seller who accepts or rejects the offer.

Having disclosed the lottery price optimization process with reference to FIGS. 1-4, the approach for robust learning employing the robust learning constraint is next described. In an illustrative example, consider a setting with a sequence of two buyers. The action of the first buyer is processed by a first stage mechanism, and the action of the second buyer is processed by a second stage mechanism performed after the first stage mechanism. The second-stage mechanism depends on the first buyer's valuation, but should not depend strongly on the first buyer's valuation if the first buyer was able to deviate from the first buyer's true valuation without incurring much penalty.

Given a continuum of buyer valuations, the welfare maximization mechanism may be posed as a semi-definite program (SDP), which is a linear program plus some extra constraints that certain matrices have non-negative eigenvalues. The SDP is posed in terms of the utility or surplus $u(v):=w(v,v)$ of a buyer with valuation v. In this context, the utility is known as the mechanism function. Surprisingly, the SDP formulation of the problem has only a number of constraints that is linear in the number of possible buyer valuations. To derive the SDP, first observe that the buyer's utility when they lie that their valuation is v' is $$w(v,v'):=z(v')\cdot v - p(v').$$

Here $z(v)$ is the vector of lottery probabilities (with each lottery probability being in the range [0,1] inclusive) that the offeror would offer to an offeree with vector of valuations v and $p(v)$ is the corresponding price for that lottery. To first order, the incentive compatibility constraint then says that telling the truth should be a stationary point of this function:

$$\frac{\partial}{\partial v'_i} w(v, v') = 0 \Rightarrow \frac{\partial}{\partial v_i} u(v)$$
$$= \left[ \frac{\partial}{\partial v'_i} w(v, v') + \frac{\partial}{\partial v_i} w(v, v') \right]_{v'=v}$$
$$= z_i(v).$$

This expression for the lottery probability also gives an expression for the price $$p(v) = \sum_i \left( v_i \frac{\partial}{\partial v_i} u(v) \right) - u(v)$$

and for the liar's utility:

$$w(v, v') := \left\{ \sum_i \left( v_i \frac{\partial}{\partial v_i} u(v') - v'_i \frac{\partial}{\partial v_i} u(v') \right) \right\} - u(v').$$

To second-order, the incentive compatibility constraint says that the liar's utility is concave $$\left[ \frac{\partial^2}{\partial v'_j \partial v'_k} w(v, v') \right]_{v'=v} \preccurlyeq 0.$$

Here ≼ is the convex (or cone) inequality and says that all eigenvalues of the matrix on the left-hand side should be non-positive. Using the expression for the liar's utility just derived, this is equivalent to $$\left[ \frac{\partial^2}{\partial v_j \partial v_k} u(v) \right] \succcurlyeq 0.$$

In other words, the mechanism function should be convex. In summary, the corresponding SDP for profit-maximization (the case of other forms of welfare is obtained trivially) is then $$\max_{u \in \mathbb{R}^n \to \mathbb{R}} \int f(v)(v \cdot \nabla u(v) - u(v)) dv^n$$

subject to:

$$u(v) \geq 0$$
$$\left[ \frac{\partial^2}{\partial v_j \partial v_k} u(v) \right] \succcurlyeq 0$$

and $$\nabla u(v) \in [0, 1]^n$$

where each constraint is for all valuations $v \in \mathbb{R}^n$. Given that this problem is over a continuum, a suitable set of basis functions must be chosen to construct an approximate solution. In low-dimensions this is suitably achieved by discretizing the range of valuations and applying conventional finite element methods for taking partial derivatives. A number of public-domain SDP solvers exist (preferably CSDP). Effective basis functions and mesh refinement techniques for solving multidimensional mechanism design SDPs are discussed by Aguilera and Morin, "On convex functions and the finite element method", Preprint arXiv:0804.1780 (2008).

This mechanism can be solved by a process analogous to the "learning-by-lottery" approach of FIGS. 3 and 4, but solving for the mechanisms rather than prices, and without constructing a mixture of mechanisms (e.g., a superposition) and using a region-censored belief update.

Within this framework, the robust learning constraint (RLC) mechanism is developed. The utility or surplus of a first buyer with valuation $v_1$ when they lie that their valuation is $v_1'$ is:

$$w_1(v_1, v_1') := z_1(v_1') \cdot v_1 - p_1(v_1')$$

given lottery probabilities $z_1$ and prices $p_1$. The corresponding utility or surplus of a second buyer with valuation $v_2$ when they tell the truth is:

$$u_2(v_2, v_1') := z_2(v_2, v_1') \cdot v_2 - p_2(v_2, v_1').$$

Observe that the lottery probabilities and prices offered to the second buyer depend on the valuations revealed by the first buyer, whether those valuations were truthful or otherwise. This enables learning. It is known that when a buyer deviates by an amount δ given their true valuation is v, the buyer pays a penalty of $$w_1(v_1, v_1) - w_1(v_1, v_1 + \delta) = \frac{1}{2} \sum_{i,j} \frac{\partial^2}{\partial v_{1,i} \partial v_{1,j}} u_1(v_1) \delta_i \delta_j + O(\delta^3).$$

The impact on the second-stage surplus is $$u_2(v_2, v_1 + \delta) - u_2(v_2, v_1) = \sum_j \frac{\partial}{\partial v_{1,j}} u_2(v_2, v_1) \delta_j + O(\delta^2).$$

The change in second-stage surplus is first order in δ and the first-stage penalty is second order in δ. Therefore we cannot ensure that small deviations will be penalized more than they affect the second-stage surplus. Indeed, it is believed that no mechanism could do so for an unbounded range of possible valuations without knowing the first-stage buyer's valuation a priori. Otherwise we would have a function that was highly-curved everywhere, which would mean that the gradient of that function, which corresponds to a lottery probability would have a magnitude larger than one somewhere, which is impossible for a probability.

However, it can be ensured that large enough deviations will be sufficiently penalized. Surprisingly, the inventors have found that this can be accomplished by applying a robust learning constraint comprising a local (i.e. differential) constraint. In particular, the robust learning constraint is imposed for some positive constant Z that bounds the relative impact of deviations:

$$\left| \sum_j \frac{\partial}{\partial v_{1,j}} u_2(v_2, v_1) \delta_j \right| \leq Z \left| \sum_{i,j} \frac{\partial^2}{\partial v_{1,i} \partial v_{1,j}} u_1(v_1) \delta_i \delta_j \right|,$$

$$\forall |\delta| = 1, \forall v_1, v_2.$$

In other words, the rate of change of the second buyer's utility with respect to the first buyer's report is bounded by the curvature of the first buyer's utility. Said another way, the robust learning constraint is computed based on a local differential of an earlier buyer's utility function with respect to the earlier buyer's valuation. So, for instance, if the first buyer reports a very high valuation, by which the first buyer can definitely obtain an item, the first mechanism function is not curved in the vicinity of that valuation (since the mechanism function is convex any curvature would have to increase the lottery probability, yet probabilities cannot exceed one) and therefore, the offer received by the second buyer is exactly the same as if the first buyer had reported any other sufficiently high valuation. This rules out the effect of buyers who make large overvaluations. On the other hand, if the first buyer reports a very low valuation, by which the first buyer obtains the item with zero probability (that is, does not obtain the item because the valuation is too low), the first-buyer's mechanism is also not curved and thus the second buyer cannot be affected by a large undervaluation by the earlier buyer.

The coefficient Z provides for tuning of the robust learning constraint. As the coefficient Z is decreased, the robust learning constraint mechanism becomes increasingly restrictive. Indeed for Z=0 the second-stage mechanism no longer depends on the valuation $v_1$ of the first (earlier) buyer. This corresponds to a mechanism which will simply not its update belief at all. On the other hand as Z→∞ the robust learning constraint mechanism approaches a "hopeful" mechanism which naively believes everything that it is told. In other words, for Z→∞ the robust learning constraint becomes inoperative.

As another illustrative example of the robust learning constraint mechanism, consider a set $\{v_1, v_2, \ldots, v_n\}$ of discrete valuations from which the first and second buyers' valuations $v_1, v_2$ are drawn. Further consider lottery probabilities $z_1(v_1)$, $z_2(v_2, v_1)$, and prices $p_1(v_1)$, $p_2(v_2, v_1)$ for stages 1 and 2. The cost to the first buyer of a deviation $v_k \to v_l$ is $$z_1(v_k) \cdot v_k - p_1(v_k) - z_1(v_l) \cdot v_k + p_1(v_l)$$

and the impact on the second buyer reporting true valuation $v_m$ is $$|z_2(v_m, v_l) \cdot v_m - p_2(v_m, v_l) - z_2(v_m, v_k) \cdot v_m + p_2(v_m^l, v_k)|.$$

The robust learning constraint then says: "for all pairs of first-stage valuations $v_k, v_l$ satisfying $|v_k - v_l| \geq \delta$, for all possible second-stage valuations $v_m$ and for some non-negative constant Z (which is not equivalent to the Z in the previous formulation, but plays an identical rôle), the lottery probabilities and prices should satisfy $$z_1(v_k) \cdot v_k - p_1(v_k) - z_1(v_l) \cdot v_k + p_1(v_l) \geq Z|z_2(v_m, v_l) \cdot v_m - p_2(v_m, v_l) - z_2(v_m, v_k) \cdot v_m + p_2(v_m, v_k)|.$$

Again, the non-negative constant Z serves as a coefficient for adjusting the robust learning constraint between a restrictive (Z approaching zero) condition and a "hopeful" (Z approaching infinity) condition.

A multiple-step, dynamic illustrative case is next considered. In general, the seller is concerned not only about the surplus of buyers, but also about the seller's own profit. To model this, we need to consider whole sequences of valuations involving a deviation at some time. We denote the sequence $v_1, v_2, \ldots, v_s', \ldots, v_t$ by $F_t^s$ where there is a deviation at time s. In terms of this deviant history, we define the payoff at time t to be $$\pi^t(F_t^s) := (1-\alpha)\{z_t(F_t^s) \cdot v_t - p_t(F_t^s)\} + \alpha p_t(F_t^s)$$

where the coefficient $\alpha \in [0,1]$ weights the part of the welfare due to buyer surplus versus seller profit. Equivalently, this may be written in terms of the mechanism function as $$\pi_t(\mathcal{F}_t^s) = (1-\alpha)u_t(\mathcal{F}_t^s) + \alpha\left\{-u_t(\mathcal{F}_t^s) + \sum_i v_{t,i} \frac{\partial}{\partial v_{t,i}} u_t(\mathcal{F}_t^s)\right\}.$$

More complex forms for the payoff can be readily envisaged involving costs for selling items or weighted preferences for different buyers. The simplest form of the robust learning constraint then requires that $$\left| \sum_j \frac{\partial}{\partial v_{s,j}} \pi_t(\mathcal{F}_t^s) \delta_j \right| \leq Z \left| \sum_{i,j} \frac{\partial^2}{\partial v_{s,i} \partial v_{s,j}} u_t(\mathcal{F}_t^s) \delta_i \delta_j \right|,$$

$$\forall |\delta| = 1, \mathcal{F}_t^s, s < t.$$

This says that the change in payoff at any future time due to a deviation at time s should not be larger than Z times the loss of buyer surplus at time s caused by that deviation. Alternatively, rather than requiring this constraint on all future payoffs individually, one may formulate a modified robust learning constraint on all future payoffs simultaneously. To do so, we define the future welfare from time t on history $F_t^s$ to be the following weighted sum $$D_t(\mathcal{F}_T^s) = \sum_{r=t,\ldots,T} \gamma^{r-t} \pi_r(\mathcal{F}_r^s)$$

in which the discount factor is $\gamma \in [0,1]$ and the time horizon is T. We note that $D_t(\bullet)$ and $\pi_t(\bullet)$ are implicitly linear functions of either the functions $(z_r, p_r)$ or the function $u_r$ and its derivatives, depending on our choice of mechanism design formulation.

The constraint coupling mechanisms across time can then be written:

$$\left|\sum_j \frac{\partial}{\partial v_{s,j}} D_{s+1}(\mathcal{F}_T^s)\delta_j\right| \leq Z \left|\sum_{i,j} \frac{\partial^2}{\partial v_{s,i} \partial v_{s,j}} u_s(\mathcal{F}_s^s)\delta_i \delta_j\right|,$$

$$\forall |\delta| = 1, \mathcal{F}_T^s, s.$$

This says in substance that the impact of a deviation at time s on the future welfare should be limited relative to the impact of that deviation on buyer s's surplus. Since each mechanism is to be constrained to be incentive compatible for its buyer, the term on the right-hand side is positive even without the absolute value. The term on the left might be positive or negative and therefore is suitably replaced by two constraints giving $$\sum_j \frac{\partial}{\partial v_{s,j}} D_{s+1}(\mathcal{F}_T^s)\delta_j \leq$$

$$Z \sum_{i,j} \frac{\partial^2}{\partial v_{s,i} \partial v_{s,j}} u_s(\mathcal{F}_s^s)\delta_i \delta_j - \sum_j \frac{\partial}{\partial v_{s,j}} D_{s+1}(\mathcal{F}_T^s)\delta_j \leq$$

$$Z \sum_{i,j} \frac{\partial^2}{\partial v_{s,i} \partial v_{s,j}} u_s(\mathcal{F}_s^s)\delta_i \delta_j$$

The seller's problem at time t, given a belief $g(\theta)$ over some parameter(s) $\theta$ of the buyer's valuation distribution $f_\theta(v)$ can then be written in full as:

$$\text{Maximize } \mathbb{E}_{\theta \sim g}\left[D_t(\mathcal{F}_T)\prod_{s=t}^T f_\theta(v_s)\right] \text{ subject to}$$

$$\sum_j \frac{\partial}{\partial v_{s,j}} D_{s+1}(\mathcal{F}_T^s)\delta_j \leq$$

$$Z \sum_{i,j} \frac{\partial^2}{\partial v_{s,i} \partial v_{s,j}} u_s(\mathcal{F}_s^s)\delta_i \delta_j - \sum_j \frac{\partial}{\partial v_{s,j}} D_{s+1}(\mathcal{F}_T^s)\delta_j \leq$$

$$Z \sum_{i,j} \frac{\partial^2}{\partial v_{s,i} \partial v_{s,j}} u_s(\mathcal{F}_s^s)\delta_i \delta_j$$

$$\left[\frac{\partial^2}{\partial v_{t,i} \partial v_{t,j}} u_t(v_t | \mathcal{F}_t)\right] \succcurlyeq 0,$$

$$\frac{\partial}{\partial v_{t,i}} u_t(v_t | \mathcal{F}_t) \in [0, 1],$$

$$u_t(v_t | \mathcal{F}_t) \geq 0.$$

For a given choice of deviation directions $\delta$ this is a semi-definite program (SDP) and can be solved in time that is polynomial in the number of basis functions used to approximate the mechanism functions. Since the constraint coupling mechanisms across time is convex and there is a solution (i.e. the program is feasible and bounded) for $Z \in \{0, \infty\}$ corresponding to no updating and the hopeful mechanism, the full problem also has a solution. Given that the SDP formulation and LP formulation are substantially equivalent, the same statement also applies in that case.

The inter-temporal constraints of these mechanisms are similar to those encountered in stochastic programming, for which an efficient decomposition of the linear program (LP) or SDP is possible. Such constraints are amenable to Bender's decomposition, as described by Infanger, "Large-Scale Systems and Benders Decomposition", Lecture Notes, MS&E348, Stanford University (2009).

Figure 5:
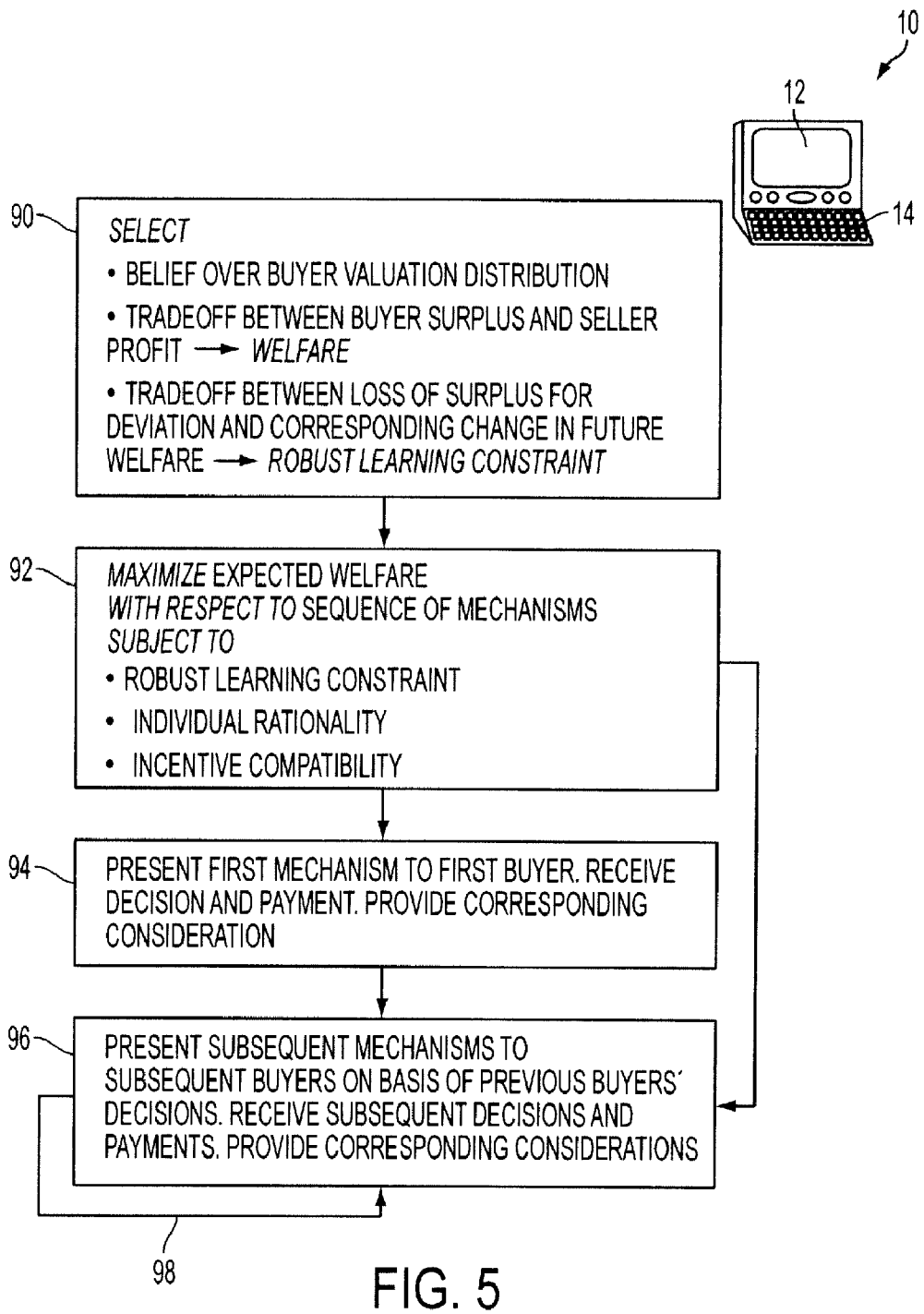
FIG. 5 diagrammatically shows a learning approach employing a robust learning constraint as disclosed herein.

With reference to FIG. 5, a process flow is shown for learning a valuation distribution including the use of a robust learning constraint as disclosed herein. In an operation 90, a valuation model is selected. This model includes an initial belief over the buyer (or, more generally, offeree) valuation distribution. The valuation model also includes a utility function that is chosen for optimization. In illustrative FIG. 5, the utility function is a welfare function quantifying a tradeoff between buyer surplus and seller profit. Alternatively, another utility function can be chosen, such as the seller profit alone, or buyer's surplus alone. Other utility functions are also contemplated. The actual utility for a given buyer is computed using the utility function constrained by a robust learning constraint which quantifies a tradeoff between (i) loss of buyer's (or, more generally, offeree's) surplus for a buyer's valuation deviation v'−v and (ii) the corresponding change in future welfare (or, more generally in the future utility function for later buyers).

In an operation 92, a mechanism (e.g., menu of lotteries) is chosen to maximize the expected welfare (or more generally to optimize the chosen utility function) respective to the mechanism for the current buyer valuation distribution belief. This optimization is constrained by the robust learning constraint computed, as disclosed herein, based on a local differential of an earlier buyer's utility function with respect to the earlier buyer's valuation. This robust learning constraint ensures that a large overvaluation or undervaluation by an earlier buyer does not have an undesirably large impact on the mechanism presented to a later buyer. The optimization is also optionally constrained by other constraints such as an individual rationality constraint and/or an incentive compatibility constraint.

In an operation 94 the first mechanism is presented to a first buyer (or first set of buyers, or more generally to a first offeree or first set of offerees), and decision information is received from the first buyer or first set of buyers. If the decision of a buyer is to make a purchase, then payment is received and consideration for said payment is provided to the buyer in the operation 94 as well. (In the case of a lottery selection having non-deterministic consideration, the buyer may in some instances "lose" the lottery and not receive anything tangible in return for the payment; nonetheless the opportunity to participate in the lottery and the chance of winning constitutes consideration in such instances). Optionally, if the first buyer's decision is not to make any purchase at all, then this may be recorded as buyer decision information.

In an operation 96, the received buyer decision information is used to update the buyer valuation distribution belief and the mechanism (e.g., menu of lotteries) for presentation to the next buyer (or next set of buyers, or more generally the next offeree or next set of offerees). The updating optimizes the buyer's utility comprising the utility function constrained by the robust learning constraint (and optionally by any other constraints of the valuation model, such as an individual rationality constraint and/or an incentive compatibility constraint). The operation 96 is repeated 98 for a sequence of subsequent buyers (or subsequent sets of buyers, or more generally subsequent offerees or subsequent sets of offerees) in order to iteratively optimize the buyer valuation distribution belief and the mechanism (e.g., the menu of lotteries).

The process flow diagrammatically depicted in FIG. 5 is suitably implemented by the illustrative computer 10 having user interfacing devices such as the illustrative display 12 and the illustrative keyboard 14, or by a server computer that is in wired or wireless connection with the Internet and via which a buyer may interact using an Internet-capable device such as a computer, cellular telephone, personal data assistant (PDA), tablet (e.g., an iPad™ available from Apple Corporation, Cupertino, Calif., USA), or so forth. The process flow diagrammatically depicted in FIG. 5 may also be embodied as a storage medium storing instructions executable on a digital processor (such as the digital processor of the computer 10) to implement the process.

Figure 6:
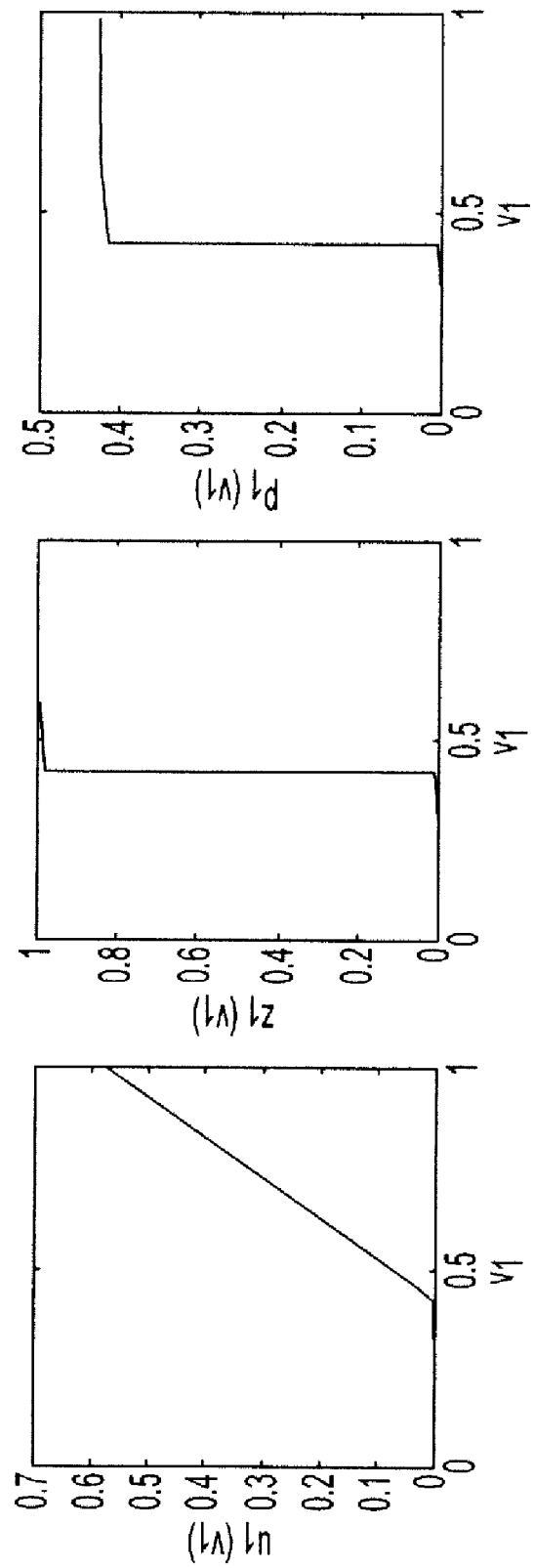
FIG. 6 plots a first-stage optimal mechanism for a two-step robust-learning-constrained (RLC) mechanism for one-dimensional valuation distribution and basis as described herein. The lefthand plot shows the mechanism function; The middle plot shows the lottery probability. The righthand plot shows the risk-neutral price for the given lottery.
Figure 7:
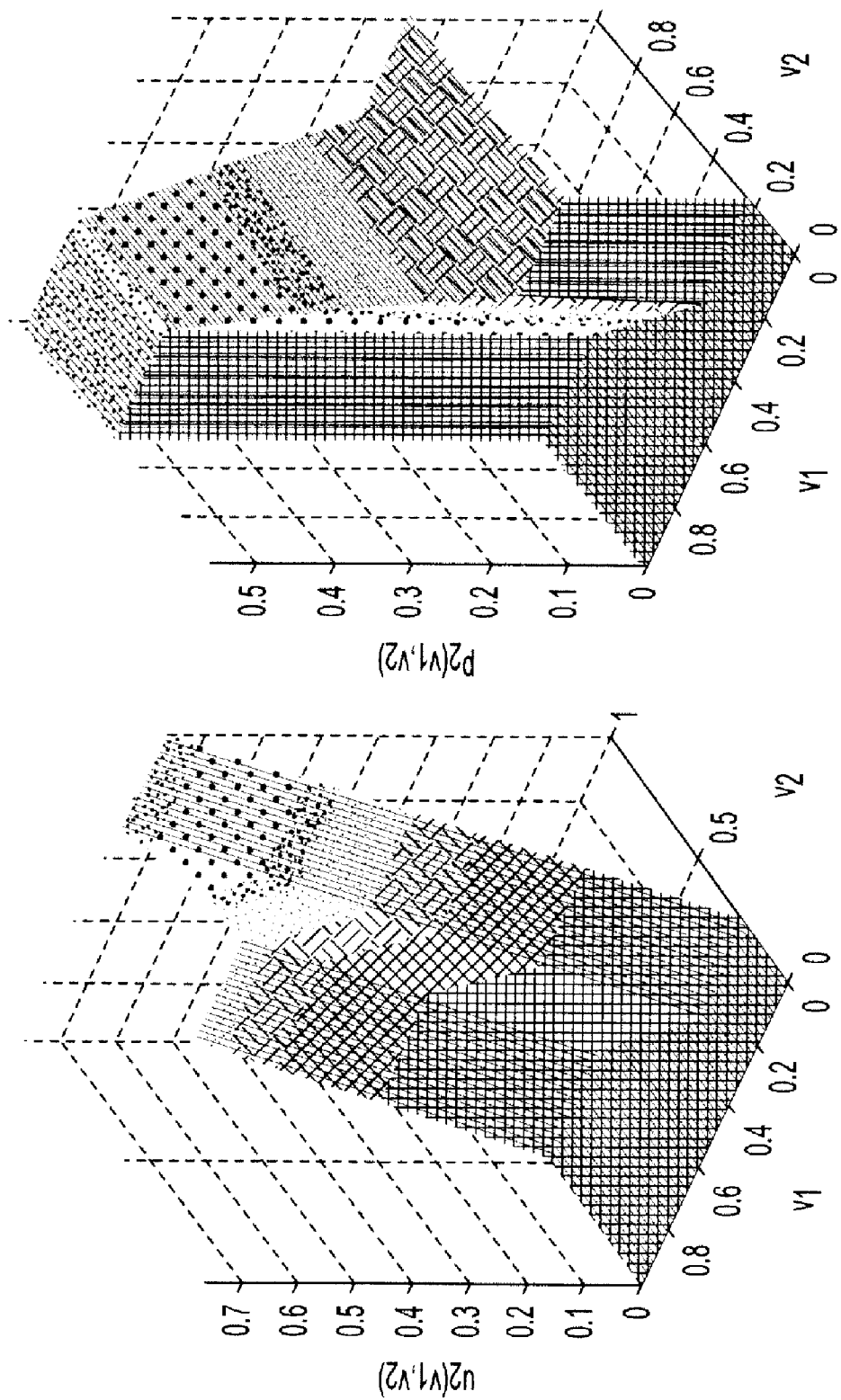
FIG. 7 plots the second-stage optimal mechanism for the two-step RLC mechanism for the same one-dimensional valuation distribution and basis described as in FIG. 6. The lefthand plot shows the mechanism function. The righthand plot shows the risk-neutral price for the given lottery.

FIGS. 6 and 7 show an example of a two-step robust-learning-constrained (RLC) mechanism for a one-dimensional valuation. The valuation is supposed to be from a normal distribution with known variance but unknown mean. A normal prior is assumed for the mean. Hence the two valuations are jointly normal. The basis is a uniform grid of 100×100 first-order elements. Thus the LP has 10,100 variables, nevertheless it takes only 5 minutes to solve with 50% CPU power on a laptop. The mechanism is a learning-by-lottery mechanism.

Figure 8:
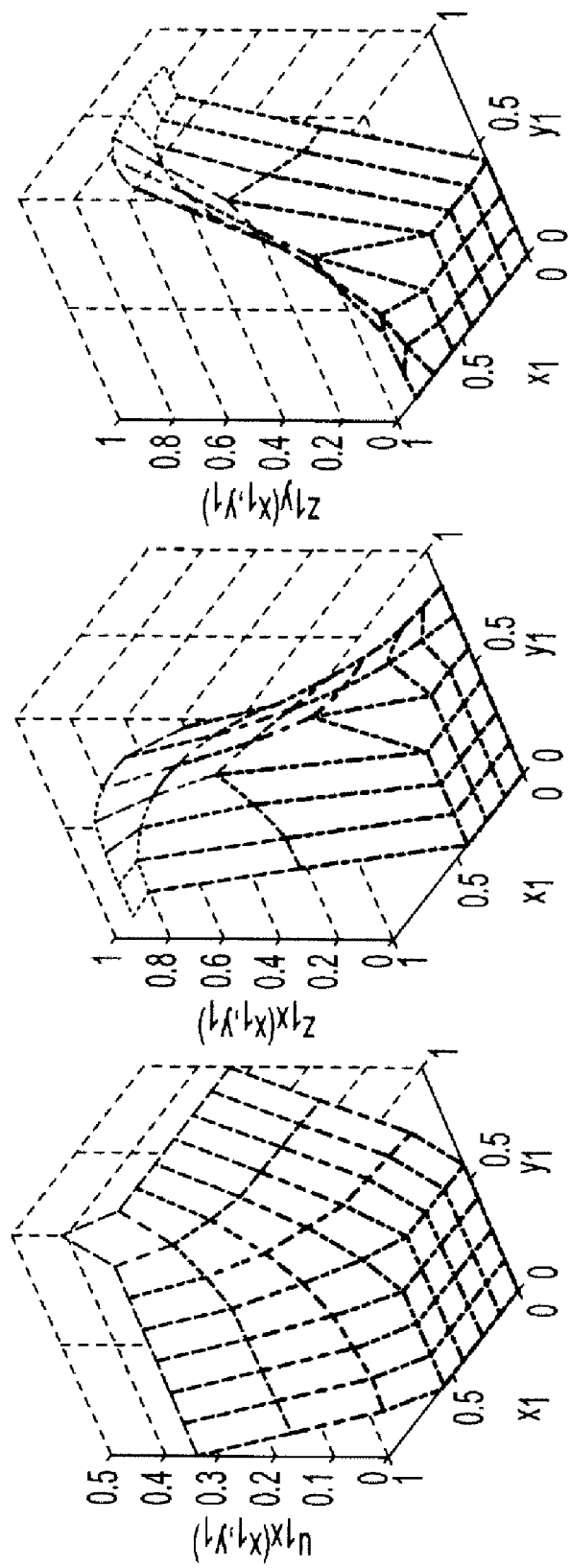
FIG. 8 plots the first-stage optimal mechanism for two-step RLC-mechanism for two-dimensional valuation distribution and basis as described herein. The lefthand plot shows the mechanism function. The middle plot shows the lottery probability for obtaining item corresponding to valuation component $x_1$. The righthand plot shows the lottery probability for obtaining item corresponding to valuation component $x_2$.
Figure 9:
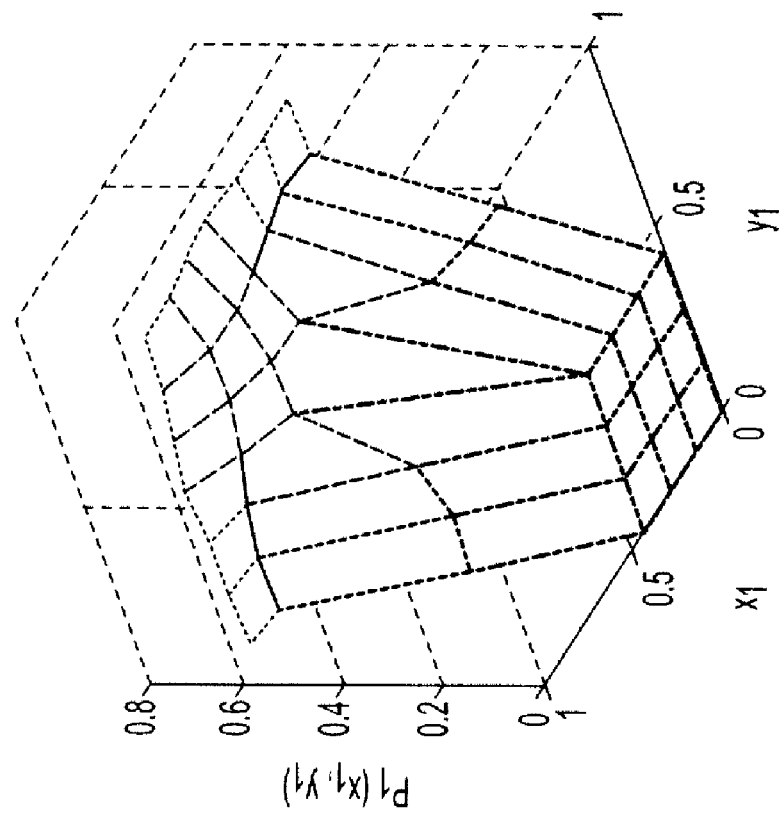
FIG. 9 plots the first-stage of the optimal mechanism for the two-step RLC-mechanism for the same two-dimensional valuation distribution and basis described as in FIG. 8. The lefthand plot shows the probability of obtaining at least some item. The righthand plot shows the risk-neutral price.
Figure 9:
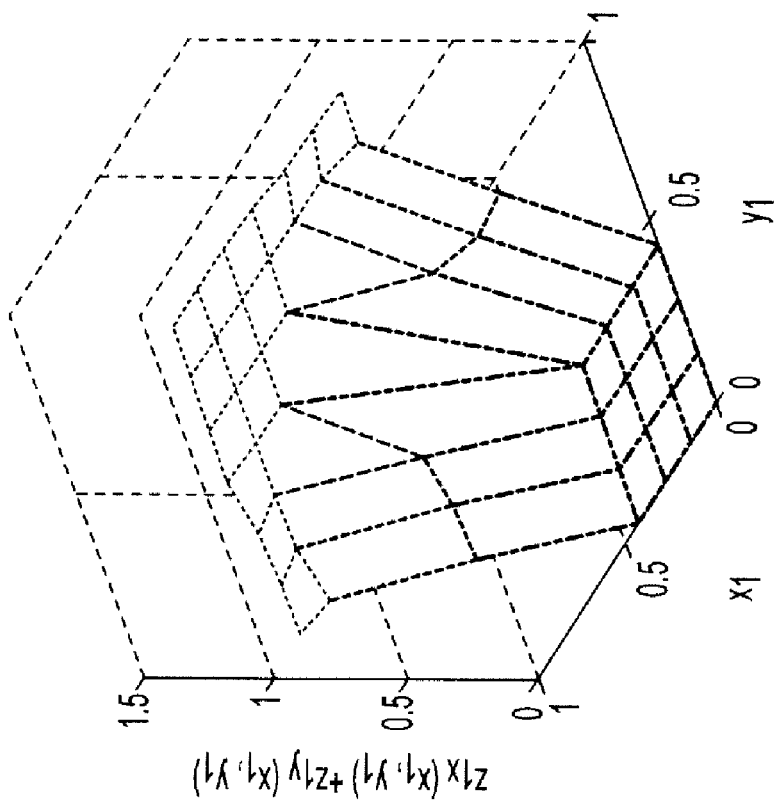

FIGS. 8 and 9 show an example of a two-step learning-by-lottery mechanism for a two-dimensional valuation (the second-stage valuation cannot be shown as it inhabits the tesseract). Each valuation 2-vector is supposed to be from a normal distribution with known variance but unknown mean. A normal prior is assumed for the mean. Hence the sequence of two 2-vector valuations is jointly normal. The basis is a uniform grid of 8×8 first-order elements. Thus the LP has $8^4+8^2=4,160$ variables, taking 230 seconds to solve with 50% CPU power on a laptop. The corresponding LP with a 10×10 grid could not be solved after 20 hours, although it only has as many variables as the first LP.

It is also contemplated to apply the robust learning constraint (RLC) mechanism as disclosed herein in a roll-out or model-based control approach, to overcome the computational burden. Such methods: (i) solve for the optimal-constrained-few-step policy from the current state; (ii) Apply the first (few) step(s) of that policy from the current state; and (iii) on observing the new state, repeat from operation (i).

The disclosed RLC mechanisms are also contemplated to be employed in conjunction with censored belief update optimization approaches. However, in such embodiments the optimal later-stage mechanisms might be "incredible". (By comparison, a mechanism is said to be "credible" or corresponds to a belief when it is an optimal single-stage non-learning mechanism for at least some belief.)

The robust learning constraint (RLC) has two parts: one corresponding to the present and another corresponding to the future. If the present buyer has a perverse interest in trying to corrupt the mechanism, then the present buyer is threatened in two ways: (i) by the fact that this action (trying to corrupt the RLC mechanism) will cost the present buyer; and (ii) by the fact that the action will only have a limited impact on the future. Since the impact on future buyers in general depends on those future buyers' valuations, an optimal mechanism may make different trade-offs between the threats (i) and (ii) depending on those future buyers' valuations. This can result in terminal-stage mechanisms that are incredible. Therefore, if one were to employ early-stage mechanisms derived from the robust learning constraint and then to update beliefs, there is the danger that provisions for controlling future impact that were present in the original mechanism are lost.

In the illustrative examples, the robust learning constraint is computed based on a local differential of an earlier buyer's utility function with respect to the earlier buyer's valuation. The term "differential" as used herein is intended to have a broad construction as illustrated by these examples. To further illustrate the broad construction of a robust learning constraint computed based on a local differential of an earlier buyer's utility function with respect to the earlier buyer's valuation, the following additional example is set forth. In this example, the robust learning constraint computed based on a local differential of an earlier buyer's utility function with respect to the earlier buyer's valuation is represented as a barrier function. Approaches employing a barrier function operate on the observation that the problem "minimize f(x) subject to g(x)>=0" (where f(x) is suitably a utility function and g(x) is suitably a representation of the robust learning constraint based on a local differential) can be written as "minimize f(x)+B(g(x))" where B(g(x)) is a barrier function that becomes large or infinite as g(x) tends to zero. This is merely a further illustrative example, and other formulations may be employed to represent the robust learning constraint computed based on a local differential of an earlier buyer's utility function with respect to the earlier buyer's valuation in a computationally tractable fashion.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising: generating buyer decision information by presenting a sequence of sale offer menus to a sequence of buyers and conducting actual sale transactions based on sale offers accepted by buyers; and at a selected time in the generating, updating a buyer valuation distribution belief and the current sale offer menu of the sequence of sale offer menus to optimize a buyer's utility comprising a buyer's utility function constrained by a robust learning constraint that is computed based on a local differential of an earlier buyers utility function with respect to the earlier buyer's valuation, the robust learning constraint bounding a rate of change of the later buyer's utility based on the local curvature of the earlier buyer's utility function at the earlier buyer's valuation; wherein the generating and the updating operations are performed by a digital processor.

2. The method of claim 1, wherein the updating is performed occasionally during the generating to iteratively optimize the buyer valuation distribution belief and the sale offer menu.

3. The method of claim 1, wherein the robust learning constraint bounds the rate of change of the later buyer's utility based on a second derivative with respect to valuation of the earlier buyer's utility function at the earlier buyer's valuation.

4. The method of claim 1, wherein the robust learning constraint is parameterized by a tuning parameter whose value adjusts the robust learning constraint.

5. The method of claim 1, wherein the updating comprises:
solving a linear program embodying the buyer's utility comprising the buyer's utility function constrained by the robust learning constraint.

6. The method of claim 1, wherein the updating comprises:
solving a semi-definite program (SDP) embodying the buyer's utility comprising the buyer's utility function constrained by the robust learning constraint.

7. An apparatus comprising: a digital processor configured to perform a method including: generating buyer decision information by presenting a sequence of sale offer menus to a sequence of buyers and conducting actual sale transactions based on sale offers accepted by buyers; and at a selected time in the generating, updating a buyer valuation distribution belief and the current sale offer menu of the sequence of sale offer menus to optimize a buyer's utility comprising a buyer's utility function constrained by a robust learning constraint that is computed based on a local differential of an earlier buyer's utility function with respect to the earlier buyer's valuation, the robust learning constraint bounding a rate of change of the later buyer's utility based on the local curvature of the earlier buyer's utility function at the earlier buyer's valuation.

8. A non-transitory storage medium storing instructions executable on a digital processor to perform a method comprising: generating offeree decision information by presenting a sequence of mechanisms to a sequence of offerees wherein the mechanisms comprise menus of transaction offers and conducting actual transactions responsive to acceptances of transaction offers by offerees; and at a selected time in the generating, updating an offeree valuation distribution belief and the current mechanism to optimize an offeree's utility comprising an offeree's utility function constrained by a robust learning constraint computed based on a local differential of an earlier offeree's utility function with respect to the earlier offeree's valuation, the robust learning constraint bounding a rate of change of the later offeree's utility based on the local curvature of the earlier offeree's utility function at the earlier offeree's valuation.

9. The non-transitory storage medium of claim 8, wherein the sequence of offerees comprises one of (i) a sequence of buyers and (ii) a sequence of sellers or suppliers.

10. The non-transitory storage medium of claim 8, wherein the updating is performed occasionally during the generating to iteratively optimize the offeree valuation distribution belief and the mechanism.

11. The non-transitory storage medium of claim 8, wherein the robust learning constraint bounds the rate of change of the later offeree's utility based on a second derivative with respect to valuation of the earlier offeree's utility function at the earlier offeree's valuation.

12. The non-transitory storage medium of claim 8, wherein the robust learning constraint is parameterized by a tuning parameter whose value adjusts the robust learning constraint.

13. The non-transitory storage medium of claim 8, wherein the updating comprises: solving a linear program embodying the offeree's utility comprising the offeree's utility function constrained by the robust learning constraint.

14. The non-transitory storage medium of claim 8, wherein the updating comprises: solving a semi-definite program (SDP) embodying the offeree's utility comprising the offeree's utility function constrained by the robust learning constraint.

* * * * *